US006186267B1

United States Patent
Hackl et al.

(10) Patent No.: US 6,186,267 B1
(45) Date of Patent: Feb. 13, 2001

(54) METHOD AND APPARATUS FOR OPERATING A STEERING SYSTEM FOR A MOTOR VEHICLE

(75) Inventors: Matthias Hackl; Wolfgang Kraemer, both of Stuttgart (DE)

(73) Assignee: Robert Bosch GmbH (DE)

( * ) Notice: Under 35 U.S.C. 154(b), the term of this patent shall be extended for 0 days.

(21) Appl. No.: 09/044,814

(22) Filed: Mar. 20, 1998

(30) Foreign Application Priority Data

Mar. 22, 1997 (DE) .............................................. 197 12 166
Nov. 19, 1997 (DE) .............................................. 197 51 137

(51) Int. Cl.$^7$ ....................................................... B62D 5/04
(52) U.S. Cl. .......................................... 180/444; 180/422
(58) Field of Search .................................... 180/444, 422, 180/428

(56) References Cited

U.S. PATENT DOCUMENTS

| 4,406,341 | * | 9/1983 | Bertin ................................... 180/428 |
| 4,421,191 | * | 12/1983 | Bertin et al. .......................... 180/417 |
| 4,492,283 | * | 1/1985 | Bertin ................................... 180/428 |
| 5,035,295 | | 7/1991 | Leiber et al. ........................ 180/140 |
| 5,089,967 | | 2/1992 | Haseda et al. ................... 364/426.02 |
| 5,205,371 | | 4/1993 | Karnopp ............................. 180/79.1 |
| 5,227,974 | | 7/1993 | Tomoda et al. ................. 364/424.05 |
| 5,229,955 | | 7/1993 | Nishiwaki et al. .................... 364/550 |
| 5,293,952 | * | 3/1994 | Ledamsisel et al. .................. 180/422 |
| 5,316,379 | | 5/1994 | Becker et al. ........................ 303/100 |
| 5,428,532 | | 6/1995 | Yasuno ............................ 364/424.05 |
| 5,732,371 | | 3/1998 | Fujita ..................................... 701/38 |
| 5,732,379 | | 3/1998 | Eckert et al. ........................... 701/83 |
| 5,742,919 | | 4/1998 | Ashrafi et al. ......................... 701/70 |
| 5,790,966 | | 8/1998 | Madau et al. .......................... 701/41 |
| 5,832,402 | | 11/1998 | Brachert et al. ....................... 701/72 |
| 5,887,675 | * | 3/1999 | Hackl et al. .......................... 180/422 |

* cited by examiner

*Primary Examiner*—Kevin Hurley
*Assistant Examiner*—Andrew J. Fischer
(74) *Attorney, Agent, or Firm*—Baker & Daniels

(57) ABSTRACT

A steering system for a motor vehicle with a steering drive train having at least one steerable wheel, one actuator and one auxiliary drive. The steering wheel is operable by the driver of the vehicle as well as by mechanically configured offset devices. The offset devices have rotating input and output shafts and a predetermined offset angle between the input shaft and the output shaft. The auxiliary drive superimposes the steering motion initiated by the steering wheel and the motion initiated by the actuator to generate the steering motion of the steerable wheel. A control signal dependent on the angular offset and the rotational motion of the input shaft is computed. The actuator is then controlled dependent on at least the generated control signal to initiate the actuator initiated motion. Any structurally unavoidable nonuniformity of rotational motion is compensated for by the superimposition of an appropriate added angle.

10 Claims, 5 Drawing Sheets

# METHOD AND APPARATUS FOR OPERATING A STEERING SYSTEM FOR A MOTOR VEHICLE

BACKGROUND OF THE INVENTION

This invention relates to a method and an apparatus for operating a steering system for a motor vehicle.

Such a prior art steering system is disclosed in DE-OS 40 31 316 (corresponding to U.S. Pat. No. 5,205,371) and, to the extent that it is relevant to this invention, will be described with reference to FIGS. 1 and 2. In such a steering system, the motions of the actuator 13 or 23, the motor angle $\delta_M$, are superimposed in the auxiliary drive 12 or 22 on the steering motions imparted by the driver through the steering wheel 11 or 21, the steering wheel angle $\delta_L$ detected by the sensor 28. The superimposed motion $\delta_L'$ thus obtained is transmitted through the steering mechanism 14 and the steering linkage 16 to the steerable wheels 15a and 15b to set the steering angle $\delta_V$. The actuator 13 or 23 can be an electric motor. The operating principle of such a servo steering system consists of providing that the steering can be accomplished very indirectly through the transmission $i_a$ of the auxiliary drive 12 or 22, and thus low steering wheel moments $M_L$ can be achieved. Because of this, very large steering wheel angles $\delta_L$ are avoided, inasmuch as suitable motor angles $\delta_M$ are superimposed, so that required output angles $\delta_L'$ can be set with steering wheel angles of ordinary size according to the equation $$\delta_L' = \delta_L / i_a + \delta_M.$$

The required motor angle $\delta_M$ required to assist steering, or its desired value, is determined from the steering wheel angle $\delta_L$. In addition, the motor angle $\delta_M$ can also depend on signals Sm, with these signals Sm representing the vehicle motions detected by the sensors 26.

In a steering system there are usually one or two universal joints to connect the shafts of the steering mechanism and of the steering wheel with angular and longitudinal displacement. If there is only one universal joint (FIG. 3), it is well known that with a constant input speed $\omega_1$ a pulsating output speed $\omega_2$ is obtained according to the following equation:

$$\omega_2 = \frac{\omega_1 * \cos\beta}{1 - \sin^2\beta * \cos^2\alpha}$$

In this equation, $\beta$ is the angular offset of the joint and $\alpha$ is the angle of rotation of the input shaft.

It is likewise known that with two universal joints, the nonuniformity of rotation $\omega_2/\omega_1$ is smoothed out by a known W- or Z-shaped arrangement, if the two angular offsets $\beta_1$ and $\beta_2$ are of equal magnitude. Other arrangements (FIG. 4) lead to nonuniform transmission of rotation, in the same way as a single universal joint.

However, transmission of the rotational steering motion has to be as uniform as possible for good steering precision; this requirement therefore limits the structural possibilities. Because of space limitations and other requirements for the arrangement of units in the engine compartment, under some circumstances no steering shaft design is possible that permits uniform transmission of motion.

The purpose of this invention is to compensate for structurally unavoidable nonuniformity of rotational steering motion.

SUMMARY OF THE INVENTION

This invention relates to a steering system for a motor vehicle with a steering drive train that comprises at least one steerable wheel, one actuator, one auxiliary drive, a steering wheel operable by the driver of the vehicle, as well as a mechanically configured offset device. The offset device has rotating input and output shafts and a predetermined angular orientation between the input and output shafts. The auxiliary drive superimposes the steering motion initiated by the steering wheel and the motion initiated by the actuator to generate the steering motion of the steerable wheel. In accordance with the invention, a control signal is computed dependent on the angular orientation and the rotational motion of the input shaft. The actuator is then controlled dependent at least on the generated control signal, to initiate the motion.

Any structurally unavoidable nonuniformity of rotational motion is compensated for by superimposing an appropriate added angle pursuant to the invention. The invention provides structural simplification and structural space benefits in the engine compartment, since it is possible to more freely choose the arrangement of the joints of the steering shaft. There are also cost benefits since, under some circumstances, a universal joint can be omitted. In the same way, uniform transmission of steering motion is possible from the invention with an unaligned W or Z arrangement (FIG. 4) with several, particularly two, offset devices. The invention also provides the possibility of more exact measurements of the actual steering wheel angle, since the steering angle sensor can be placed ahead of the offset device (between the steering wheel and the auxiliary drive), because according to the invention the input and output drive angles of the offset device are the same.

The offset devices can be in the form of cardan or universal joints.

It is also provided in particular that the computation of the control signal depends on whether the offset devices in the steering drive train are located ahead of or beyond the auxiliary drive.

DESCRIPTION OF THE PREFERRED EMBODIMENT

The invention will be illustrated hereinbelow with an example of an embodiment, for which the starting point is the auxiliary steering as mentioned hereinabove, by way of example.

Figure 1:
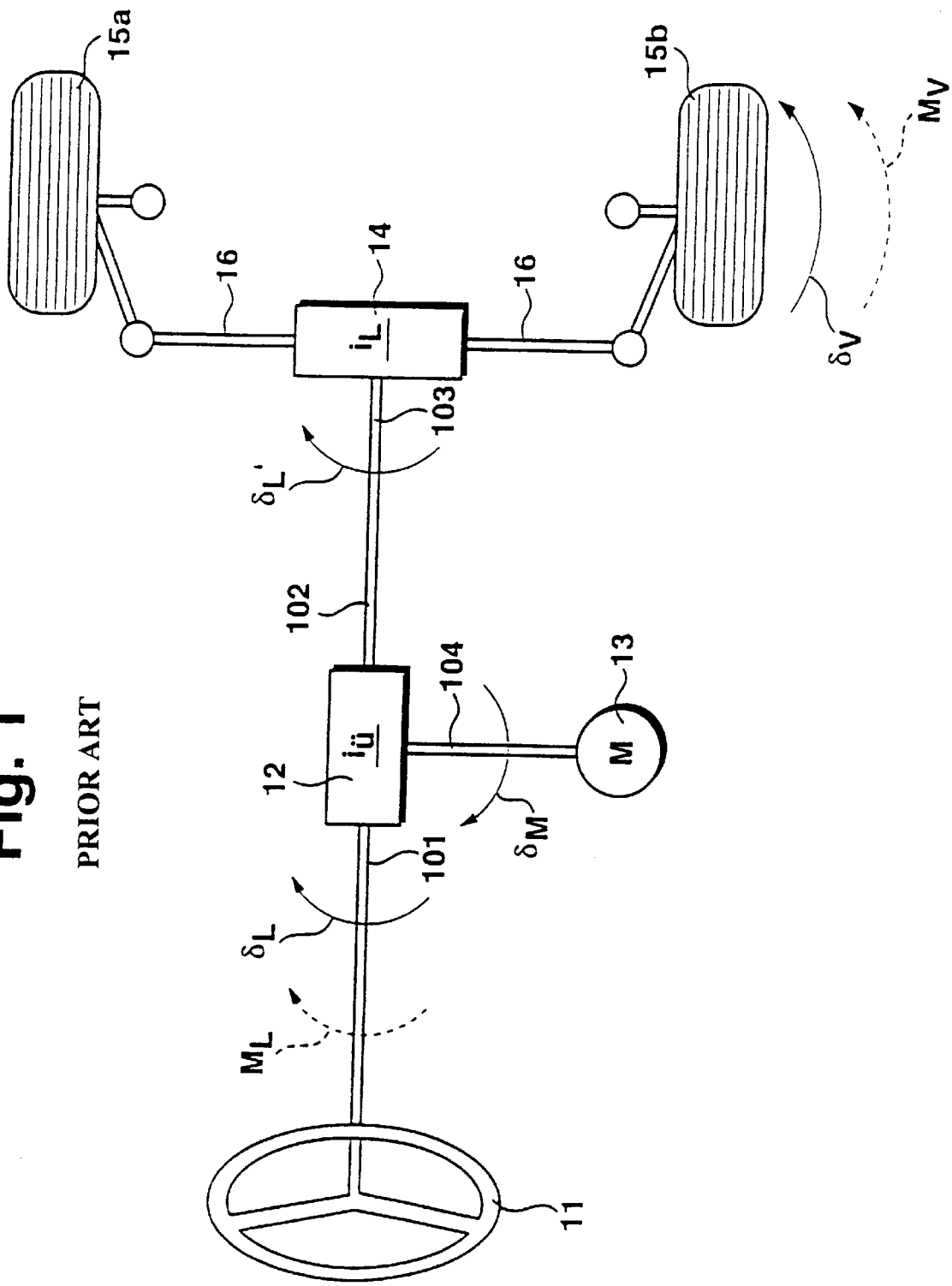
FIGS. 1 and 2 show schematically the steering system pursuant to the prior art
Figure 2:
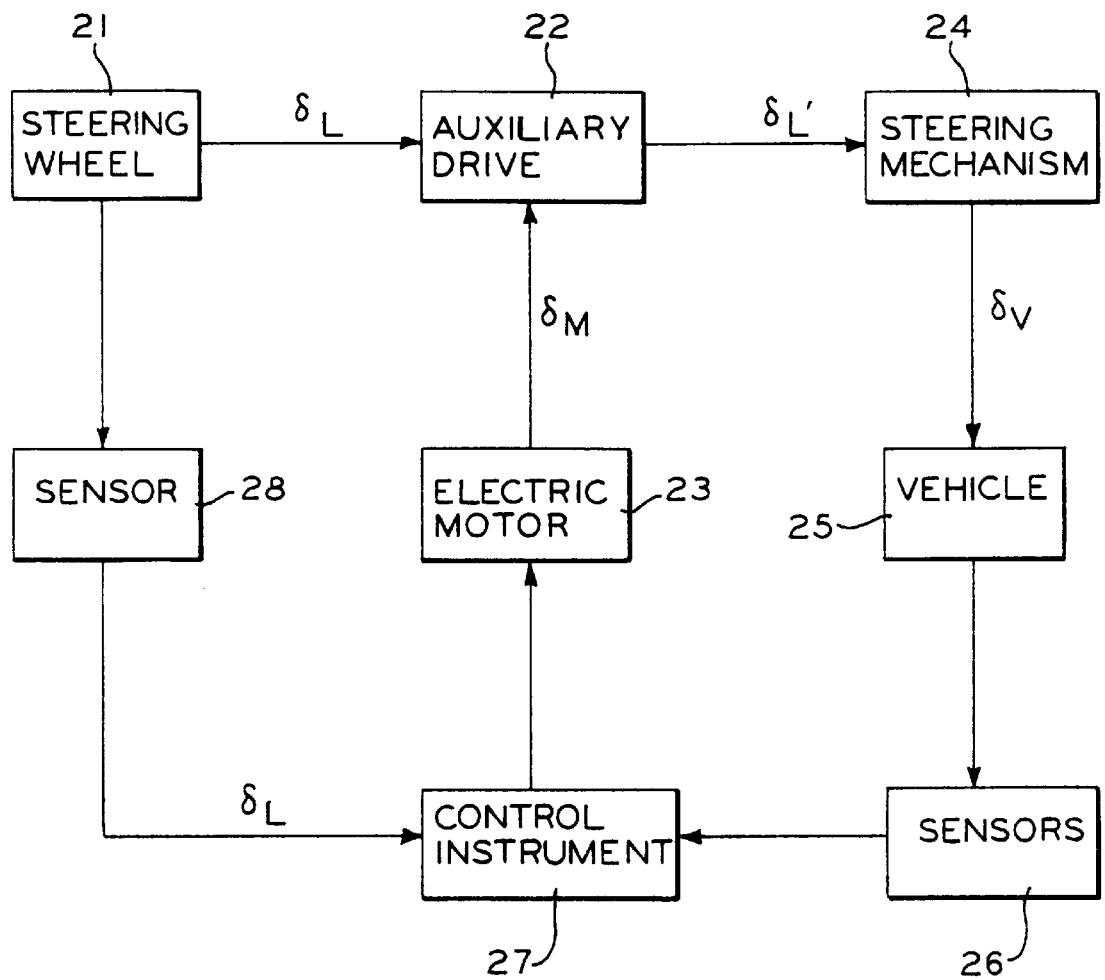

FIG. 1 and FIG. 2 with the reference symbols 11 and 21, respectively, show a steering wheel operable by the driver of the vehicle. By operating the steering wheel 11 or 21, the steering wheel angle $\delta_L$ and the steering wheel moment $M_L$ are transmitted to the auxiliary drive 12 or 22. At the same time the motor angle $\delta_M$ of the actuator 13 or 23 is transmitted to the auxiliary drive 12 or 22; the actuator can be an electric motor. The superimposed motion $\delta_L'$ is transmitted at the output of the auxiliary drive 12 or 22 to the steering mechanism 14 or 24, which in turn impacts the steerable wheels 15a and 15b with the steering angle $\delta_V$ corresponding to the total angle $\delta_L'$ through the steering linkage 16. FIG. 2 also shows sensors 28 and 26, with the sensor 28 detecting the steering wheel angle $\delta_L$ and feeding it to the control instrument 26 [sic], while the sensors labeled 26 sense the motions of the vehicle 26 (e.g., yawing motions, transverse acceleration, vehicle speed, etc.) and supply them to the control instrument 27. The control instrument 27 determines a correcting variable i dependent on the detected steering wheel angle $\delta_L$ and, as the case may be, dependent on the vehicle motions, to control the actuator 13 or 23.

Figure 3:
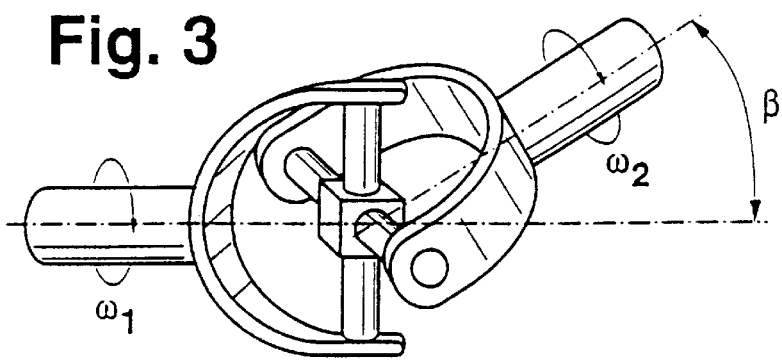
FIG. 3 shows a universal joint.
Figure 5:
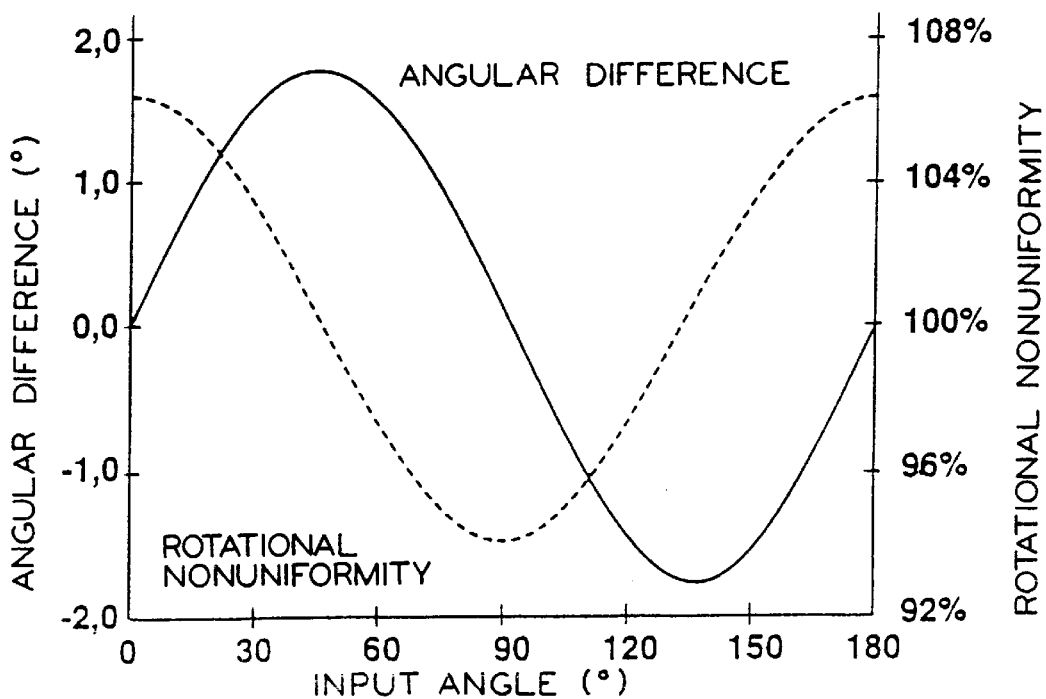
FIG. 5 shows the nonuniformity of rotation (for a single universal joint with $\beta=90°$).
Figure 6:
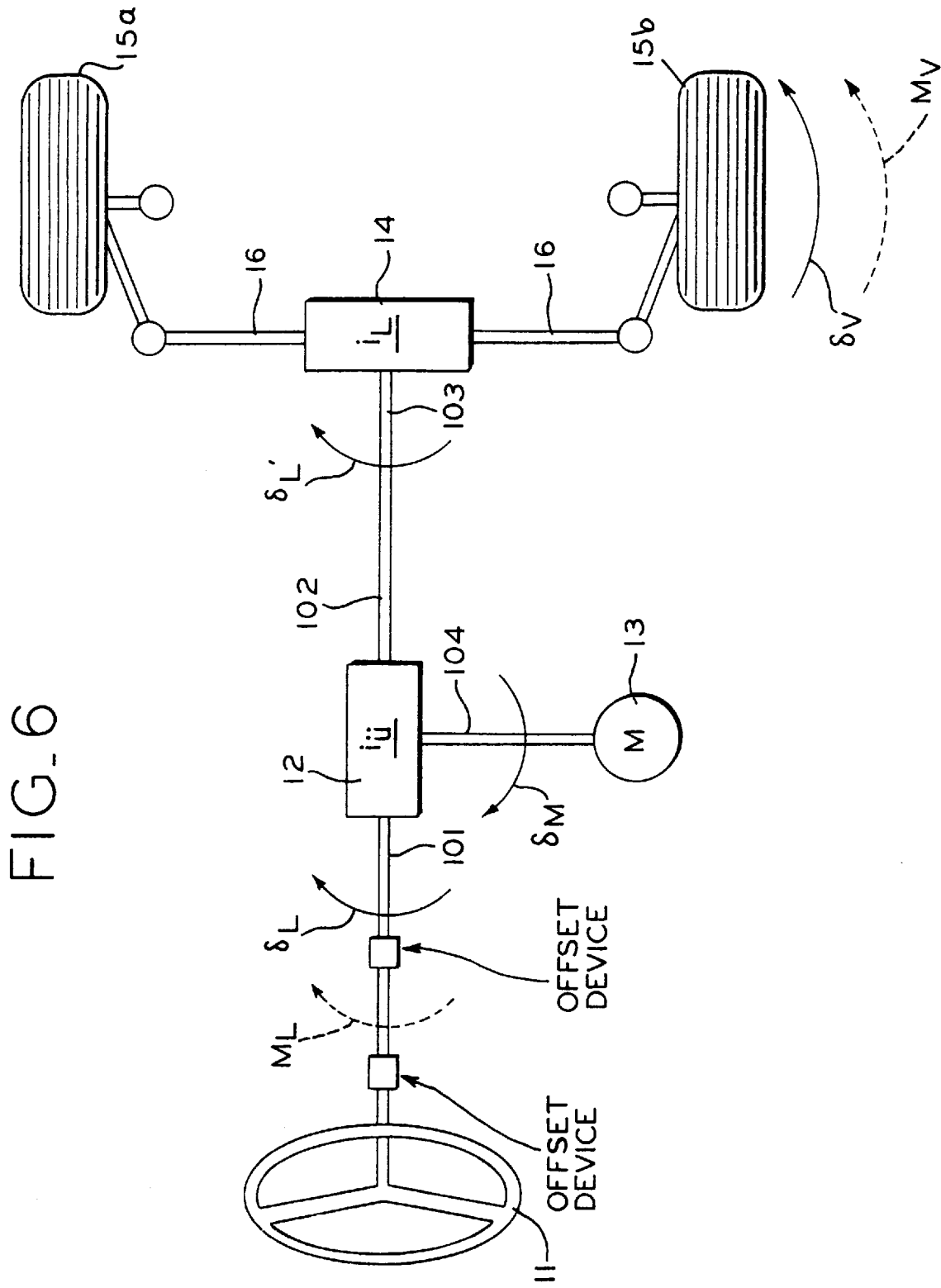
Figure 7:
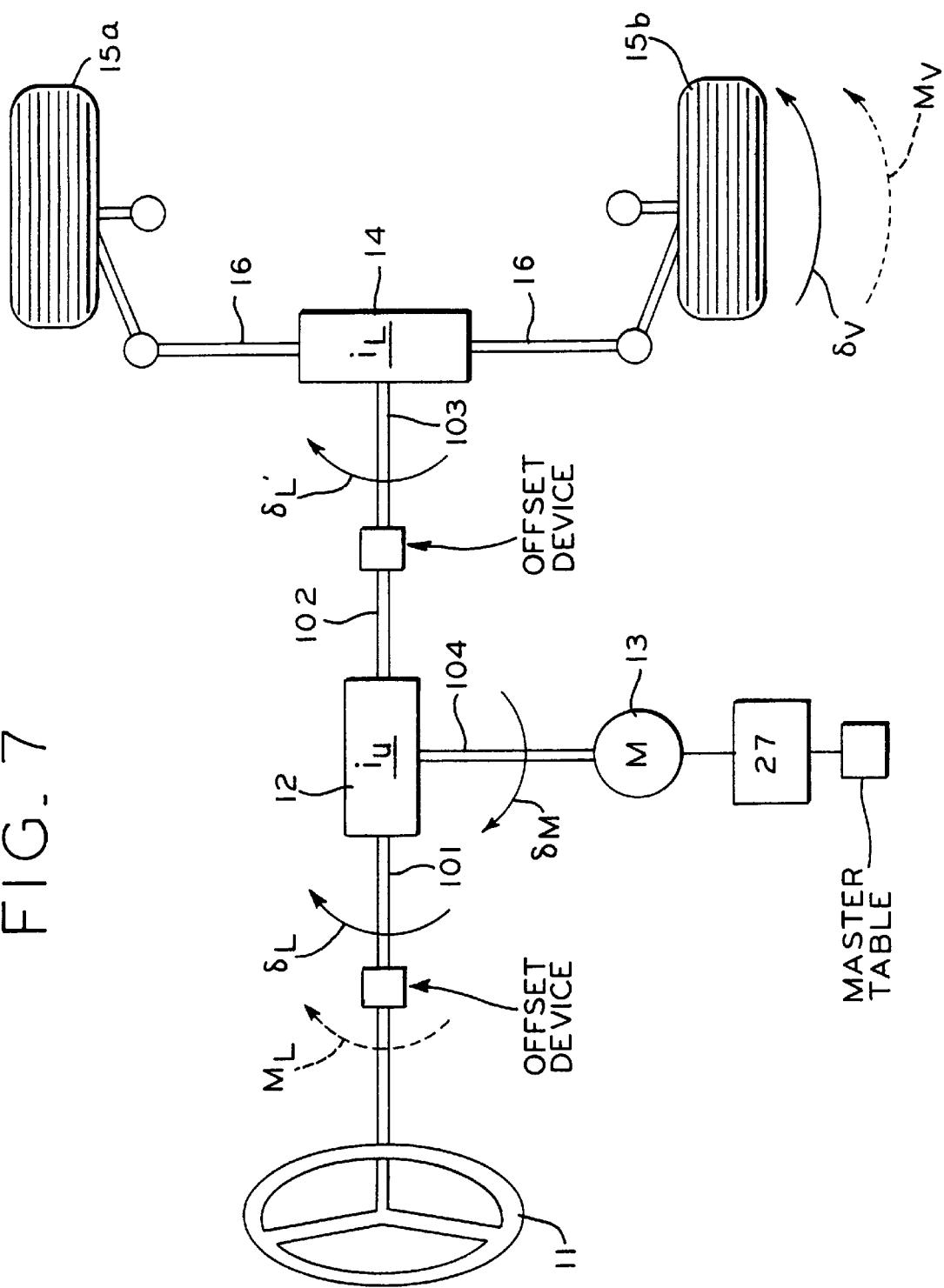

The behavior of a single universal joint with an angular offset β=20 is illustrated by way of example (FIG. 3). The angular difference and the nonuniformity of rotation between the output and input are illustrated in the diagram shown in FIG. 5 over only half a rotation, since the curve repeats every 180°. Pursuant to the invention, an added angle $\delta_{M,kard}$ (compensating angle) is now superimposed on the steering angle $\delta_L$ with the active steering system, and compensates for the angular difference and nonuniformity of rotation. The actuator 13 or 23 for this purpose is impacted by the control instrument 27 with the corresponding desired value $\delta_{M,soll,kard}$. Other components (e.g., dependent on the vehicle's state) can be calculated in addition, and superimposed on the component $\delta_{M,soll,kard}$ to compute the desired value $\delta_{M,soll}$ actually to be transmitted to the servo unit.

The compensating angles are to be determined by different algorithms depending on where the added angle is introduced in the active steering system, ahead of or following the universal joint.

Superimposition ahead of the universal joint:

$$\delta_{M,soll,kard}=\arctan(\cos\beta^* \tan\alpha)-\alpha$$

Superimposition following the universal joint:

$$\delta_{M,soll,kard}=\arctan(\tan\alpha/\cos\beta)-\alpha$$

in which β is the offset angle of the joint and α is the angle of rotation of the input shaft.

The compensating angle $\delta_{M,soll,kard}$ can be determined by analytical calculation; however, it is more practical with regard to programming the control instrument to calculate the compensating angle $\delta_{M,soll,kard}$ from a previously calculated table and by interpolation between the tabulated points. It is sufficient in this case to set down the tabulated points for α=0 to 45°, since this curve shape repeats itself in mirrored fashion or with a negative sign. This also solves the problem of indeterminacy of the arctangent function at 90°.

In summary, the following benefits of the invention can be mentioned:

Structural simplification and structural space benefits in the engine compartment, since it is possible to arrange the joints of the steering column more freely.

Cost benefit since a universal joint can be omitted under some circumstances.

Figure 4:
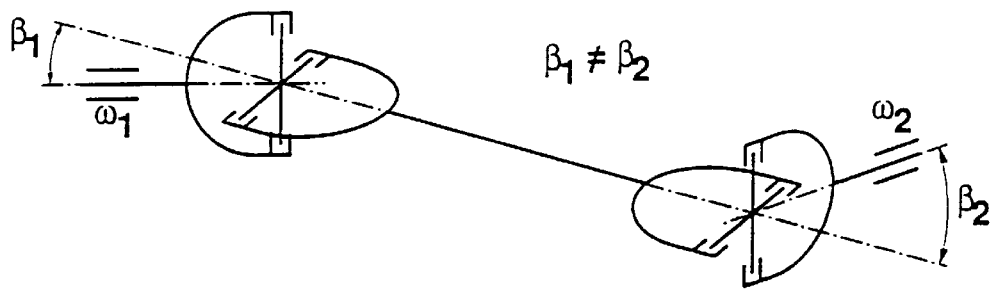
FIG. 4 shows an arrangement with two joints.

Uniform transmission of steering motion with unaligned W/Z arrangement (FIG. 4).

More exact measurement of the actual steering wheel angle, since the steering angle sensor can be placed ahead of the universal joint (between steering wheel and auxiliary drive), since the input and output angles of the universal-joint shaft are the same.

Determination of the compensating angle $\delta_{M,soll,kard}$ by analytical calculation or from a precalculated table.

What is claimed is:

1. A method for operating a steering system for a motor vehicle including a steering drive train having at least one steerable wheel, one actuator, and one auxiliary drive, and wherein the steering wheel is operable by a driver of the vehicle and by mechanically configured offset devices, the offset devices having a rotatable input shaft and output shaft, the input and output shafts having central axes that are angularly offset with respect to each other, said method comprising:

initiating a steering motion with the steering wheel;

initiating an actuator motion with the actuator;

superimposing the steering motion and actuator motion with the said auxiliary drive to generate a steering motion of the steerable wheel by computing a control signal as a function of the angular offset and the rotational motion of the input shaft; and controlling the actuator to initiate the motion as a function of the compiled control signal.

2. A method according to claim 1, wherein the offset devices are one of cardan joints and universal joints.

3. A method according to claim 1, wherein the computation of the control signal is dependent on whether the offset devices are located in the steering drive train and one of ahead of and following the auxiliary drive.

4. A method according to claim 1, wherein the computation of the control signal is accomplished by analytical calculations.

5. A method according to claim 1, wherein the computation of the control signal is accomplished from a master table by one of interpolation between the tabulated values and predetermined performance characteristics.

6. A method according to claim 3, wherein the control signal, when the offset devices are located in the steering drive train between the steering wheel and the auxiliary drive, is computed in accordance with the equation $$\delta_{M,soil,kard}=\arctan(\tan\alpha\cos\beta)-\alpha.$$

7. A method according to claim 3, wherein the control signal, when the offset devices are located in the steering drive train between the auxiliary drive and the wheels, is computed in accordance with the equation $$\delta_{M,soil,kard}=\arctan(\cos\beta^* \tan\alpha)-\alpha.$$

8. An apparatus for operating a steering system for a motor vehicle, said apparatus comprising steering drive train having at least one steerable wheel, one actuator and one auxiliary drive, and wherein the steering wheel is operable by a driver of the vehicle and by mechanically configured offset devices, the offset devices having rotatable input and output shafts which have central axes that are angularly offset with respect to each other and wherein the steering motion initiated by the steering wheel and the motion initiated by the actuators are superimposed by the auxiliary drive to generate the steering motion of the steerable wheel, by computing:

a control signal as a function of the angular offset and the rotational motion of the input shaft, and by controlling the actuator to initiate the motion as a function of a generated control signal.

9. An apparatus according to claim 8, wherein the offset devices are cardan joints or universal joints.

10. An apparatus according to claim 8, wherein the computation of the control signal is dependent on whether the offset devices are located in the steering drive train in one of ahead of and following the auxiliary drive.

* * * * *